US009776843B2

(12) United States Patent
Luinge

(10) Patent No.: US 9,776,843 B2
(45) Date of Patent: Oct. 3, 2017

(54) WHEEL BASE MEASURING LIFTING SYSTEM FOR LIFTING A VEHICLE AND METHOD THEREFOR

(71) Applicant: Stertil B.V., Kootstertille (NL)

(72) Inventor: Johan Luinge, Oosterwolde (NL)

(73) Assignee: Stertil B.V., Kootstertille (NL)

( * ) Notice: Subject to any disclaimer, the term of this patent is extended or adjusted under 35 U.S.C. 154(b) by 355 days.

(21) Appl. No.: 14/097,880

(22) Filed: Dec. 5, 2013

(65) Prior Publication Data

US 2014/0161583 A1 Jun. 12, 2014

Related U.S. Application Data

(60) Provisional application No. 61/735,111, filed on Dec. 10, 2012.

(30) Foreign Application Priority Data

Dec. 10, 2012 (NL) .................................... 2009948

(51) Int. Cl.
*B65G 69/00* (2006.01)
*B66F 3/46* (2006.01)
*B66F 7/28* (2006.01)

(52) U.S. Cl.
CPC . *B66F 3/46* (2013.01); *B66F 7/28* (2013.01)

(58) Field of Classification Search
CPC ...... B66F 3/46; B66F 7/28; B66F 7/00; B66F 7/20; B60S 9/00; B60S 9/02; B60S 9/04; B60S 9/10
USPC .......... 414/21; 187/203, 205, 216, 217, 218; 254/45, 92, 98, 89 R, 90; 73/115.07, 73/117.01, 117.02, 117.03; 702/158
See application file for complete search history.

(56) References Cited

U.S. PATENT DOCUMENTS

| | | | | |
|---|---|---|---|---|
| 2,015,357 A * | 9/1935 | Weaver | B66F 7/16 | 187/205 |
| 2,533,981 A * | 12/1950 | Weaver | B66F 7/246 | 187/218 |
| 3,111,196 A * | 11/1963 | Plassman | B66F 7/18 | 187/216 |
| 5,259,482 A * | 11/1993 | Proulx | E04H 5/06 | 187/205 |
| 5,292,218 A * | 3/1994 | Ikenouchi | E04H 6/183 | 414/231 |
| 5,404,968 A | 4/1995 | Fletcher | | |

(Continued)

FOREIGN PATENT DOCUMENTS

| | | |
|---|---|---|
| EP | 2181958 A1 | 5/2010 |
| WO | 2004026754 A2 | 4/2004 |

(Continued)

*Primary Examiner* — Anna Momper
*Assistant Examiner* — Lynn Schwenning
(74) *Attorney, Agent, or Firm* — The Webb Law Firm

(57) ABSTRACT

Disclosed is a wheel based measuring system and a method for lifting a vehicle. The lifting system includes one stationary lift; a number of moveable lifts; positioning means for defining a position of a wheel axle of the vehicle; distance measuring means for determining the distance of the vehicle to a reference point; and control means for determining the distance between two vehicle axles and steering the one or more moveable lifts to the correct position.

17 Claims, 4 Drawing Sheets

(56) References Cited

U.S. PATENT DOCUMENTS

| | | | | |
|---|---|---|---|---|
| 6,301,548 | B1 * | 10/2001 | Gerum | B60T 8/1708 702/158 |
| 6,823,246 | B2 * | 11/2004 | Jackson | G01B 5/255 33/264 |
| 6,983,196 | B2 * | 1/2006 | Green | B66F 7/04 254/45 |
| 7,165,337 | B1 * | 1/2007 | Fetters | G01B 5/255 33/203.18 |
| 2004/0149520 | A1 | 8/2004 | Taylor et al. | |
| 2008/0046220 | A1 * | 2/2008 | Fudala | G05D 1/0212 702/189 |
| 2008/0224107 | A1 | 9/2008 | Polins et al. | |
| 2009/0216484 | A1 * | 8/2009 | Schommer | G01B 11/2755 702/150 |
| 2009/0271137 | A1 * | 10/2009 | Torri | G01B 21/26 702/104 |
| 2010/0108445 | A1 | 5/2010 | Kritzer | |
| 2011/0063859 | A1 * | 3/2011 | Dantas | B66F 7/28 362/459 |
| 2011/0119013 | A1 * | 5/2011 | Onea | G08G 1/054 702/96 |
| 2011/0199232 | A1 * | 8/2011 | Healy | B66F 7/28 340/932.2 |
| 2011/0308309 | A1 * | 12/2011 | Nobis | G01B 11/2755 73/115.07 |
| 2012/0193590 | A1 | 8/2012 | Horwath et al. | |

FOREIGN PATENT DOCUMENTS

| | | | |
|---|---|---|---|
| WO | 2006112857 | A2 | 10/2006 |
| WO | 2012047787 | A1 | 4/2012 |

* cited by examiner

WHEEL BASE MEASURING LIFTING SYSTEM FOR LIFTING A VEHICLE AND METHOD THEREFOR

CROSS-REFERENCE TO RELATED APPLICATIONS

This application claims priority to U.S. Provisional Application No. 61/735,111 and The Netherlands Patent Application No. 2009948, both filed Dec. 10, 2012, the disclosures of which are hereby incorporated by reference in their entirety.

BACKGROUND OF THE INVENTION

Field of the Invention

The invention relates to a vehicle lifting system and more specifically to a system comprising one or more moveable lifts or lifting devices. These lifting systems are specifically used for lifting trucks and busses, or other vehicles.

Description of Related Art

A known vehicle lifting system with a moveable lifting device is disclosed in WO 2006/112857. Such a lifting system relates to a moveable in-ground lifting system that is provided with a scissor type lifting device with the additional advantage that the installation depth is relatively small. The moveable lifting device is manoeuvred under the rear axle of the vehicle, like a bus or truck, in accordance with the specific axle distance of this vehicle. In case of an incorrect positioning, the vehicle may tumble from the lifting device, thereby creating a safety concern. Especially when confronted with different types of vehicles on the lifting system, it is problematic to guarantee a correct position of the moveable lifting device under the vehicle. For example, companies are confronted with over 200 types of vehicles that have different dimensions.

An object of the invention is to obviate or at least reduce the above problems and to improve safety when lifting a vehicle.

SUMMARY OF THE INVENTION

This object is achieved with a vehicle lifting system according to the invention, the vehicle lifting system comprising:

- one stationary lift;
- a number of moveable lifts;
- positioning means for defining a position of a wheel axle of the vehicle;
- distance measuring means for defining the distance of the vehicle to a reference point; and
- control means for determining the distance between two vehicle axles and steering the one or more moveable lifts to the correct position.

While lifting a vehicle, at least two of the wheel axles of the vehicle have to be positioned over the lifts of the lifting system. The wheel base distance defines the distances between axles of the vehicle. The wheel base distance is a measure for correct positioning of the lifts.

Preferably, the front wheels are positioned in a wheel positioning hatch or wheel recess, preferably adjacent to the stationary lift. One or more movable lifts are positioned under some or all of the other vehicle axles.

Different configurations are possible for the position of the vehicle relative to the lifting system.

In a first configuration, when positioning the vehicle, the vehicle rides past or over the movable lifts and the front axle is positioned over or on top of the stationary lift. The other wheel axles are positioned relative to the moveable lifts.

In a second configuration, when positioning the vehicle, the vehicle rides past or over the stationary lift and the front axle is positioned over or on top of a movable lift. In case the lifting system comprises more than one movable lift, the front axle is preferably movable over the lift at the largest distance from the stationary lift. The rear axle to be lifted is positioned over or on top of the stationary lift.

By providing positioning means a wheel axle can be positioned accurately. Preferably, the wheel position can be defined accurately. The distance measuring means determine the distance of the vehicle to a reference point. As the wheel axle is accurately positioned with the positioning means, either directly or indirectly through defining the wheel position, the distance from this vehicle to a reference point is measured. By performing a separate measurement for every wheel axle that needs to be lifted the control means are capable of determining the distance between two vehicle axles by calculating the difference between the distances of the vehicle to a reference point for different wheel axles. After the distance between two vehicle axles is calculated the control means steer one or more movable lifts to the correct position.

By measuring the actual wheel base distance between individual wheel axles, automatically the desired lifting position for the lifts of the lifting system is detected. This is achieved by first positioning one of the wheel axles, preferably the front axle, in a defined position, for example with a wheel positioning edge or recess. By comparing the distance measurement with the measurement(s) for other wheels and wheel axles the desired wheel axles distances can be determined. Using the determined distances between the wheel axles the movement of the moveable lifting device is controlled and the lifts are positioned correctly for the type of vehicle that needs to be lifted.

Preferably, the lifts lift the vehicle by engaging the vehicle axles. Alternatively, the vehicle can be lifted by the lifts engaging on another part of the vehicle.

Automatically detecting the desired lifting position and next, preferably fully automatic, moving the moveable lift or lifts to the desired position, guarantees a correct positioning of the lifts under the vehicle independent of the vehicle type. Furthermore, the system according to the invention guarantees a correct and safe lifting operation. A further advantage of the lifting system according to the invention is that the operation of the vehicle lifting system does not depend on the type of vehicle that needs to be lifted. New vehicle types can be lifted as easily as known conventional vehicles.

Preferably, the system according to the invention involves positioning means, such as a wheel recess, that are configured for defining a wheel axle. The distance measuring means are configured for measuring a distance between a vehicle reference point, such as the front or back or other position of the vehicle, and a reference point. The control means are configured for calculating the wheel base distance for a specific vehicle using measurements of different distances corresponding to the different wheel axles of the vehicle. This provides an effective and independent measurement of the wheel base distance of any vehicle that needs to be lifted as the system according to the invention determines the actual wheel base distance based on actual measurement without necessarily depending on historical data or other data. This improves the flexibility and/or safety of the system according to the invention. As a further advantage a preferred system according to the invention is capable of dealing with any number of axles of a vehicle as the system may detect each individual axle independently, for example by the wheel recess acting as wheel positioning means.

In a presently preferred embodiment the system according to the invention relates to a so-called in-ground lifting device. Such vehicle lifting system comprises a first lifting device that preferably has a stationary position and is used for lifting the front, or alternatively the rear, of the vehicle. The system further comprises at least one second moveable lifting device for lifting the rear part, or alternatively the front part, of the vehicle. The lifts of such lifting system are preferably provided in a pit. The pit enables a translational movement in the length of the vehicle to be lifted for the moveable lifting device. The moveable lift moves in a pit such that can be dealt with a wide range of vehicle dimensions. Preferably, the pit is covered with a pit cover. Preferably, the moveable lift is connected to the pit cover such that the pit remains covered during the operation. Depending on the dimensions of the vehicle, for example the amount of axles or axles, more than one moveable lift according to the invention may be provided.

The vehicle lifting system according to the invention may comprise lifts of a scissor type or alternatively of a telescopic type. The scissor type lift has the additional advantage that a relatively shallow pit construction can be used which can be applied beneficially to situations with bedrock, water table or unstable soil conditions. Both types accommodate vehicles with relatively low ground clearance.

Preferably, the vehicle is lifted by the lift engaging one of the wheel axles or axles of the vehicle. The one or more movable lifts are positioned based on the distance as determined between two vehicle axles. In case more than two vehicle axles need to be lifted, the wheel base measuring lifting system according to the present invention can steer a movable lift to the movable desired position after determining the distance between the second axle and the first axle, while, if relevant, at the same time measuring the distance between a third wheel axle and the other axles. This achieves an effective and efficient positioning of the movable lift reducing the time required for positioning a vehicle relative to the lifting system according to the invention.

In a presently preferred embodiment according to the present invention the positioning means comprise a recess. An alternative positioning means may comprise a ramp, for example. The advantage of using a recess is the clearly defined wheel position in the recess due to gravity. As the wheel is exactly positioned the wheel axle is also defined relatively accurate. The recess can be shaped in a suitable form, including a ditch, a channel, a hole and the like. Preferably, the recess is provided with a detector. The detector measures the presence of a wheel in the recess, or other positioning means, and, in addition, the detector may activate the measuring means and/or the control means for starting a measurement and/or calculation for the distance of a vehicle from a reference point and/or between two vehicle axles.

In a presently preferred embodiment according to the present invention the recess corresponds to a wheel recess associated to a stationary lift.

Lifting systems with one or more movable lifts also have one stationary lift. To aid in positioning the wheel axle relatively to the stationary lift a wheel recess is often provided. By using this recess also for the wheel base measuring system according to the present invention, and in particular for the positioning means thereof, an effective lifting system is achieved without the need for providing additional positioning means, such as additional recesses in the floor of a workplace, for example.

In an advantageous preferred embodiment according to the present invention the distance measuring means comprise a transmitter and a receiver.

By having the distance measuring means comprising a transmitter and a receiver a wireless distance measurement can be performed. Optionally, the measurement information is forwarded to the control means wirelessly. The measuring means involve a sensor preferably comprising a type of transmitter and a type of receiver. This involves the use of RF, IR etc. More particularly the sensor may involve a laser including infra-red lasers, ultraviolet lasers, X-ray lasers and the like.

In addition, by providing a contactless sensor the robustness of the system is further improved. No physical contact between the detection means and the vehicle is required for determining the desired lifting position.

Preferably, the control means comprise a process controller. More preferably, the process controller is the overall lifting system controller that integrates the wheel bases measuring system with the lifting system to provide an integrated wheel based lifting system for lifting a vehicle. This also enables to start moving the movable lift to its desired lifting position while manoeuvring the vehicle relative to the lifting system. This reduces the time required for positioning a vehicle on the lifting system.

Furthermore, the integrated process controller enables performing additional safety checks to see whether the measured and/or calculated distances are in an expected range and to provide an operator with an alarm in case the measured and/or calculated distance is outside such range.

Preferably, the process controller of the wheel base measuring lifting system further comprises a camera system mounted on the lift configured for detecting the engagement of the lift on the vehicle. By providing a camera system on the lift the actual engagement of the lift on the vehicle can be monitored. Optionally, a LED light or other light source is provided to improve the camera view. Preferably, a user or operator is provided with a visual and/or other indication of the actual engagement when the lift is in use. For example, such indication is provided on a touch screen of the lifting system. This provides additional safety to the lifting operation.

In a further preferred embodiment, the lift comprises a load sensor to measure the load on the lift. This further enhances the safety of lifting a vehicle as an overload is detected and, for example, a warning signal can be provided.

Preferably, the load sensor is configured to provide an indication that the load is put on the shaft of the vehicle during a lifting operation. This enables the performance of a safety check on the engagement of the lift on the vehicle. In a presently preferred embodiment, after measuring the wheel base of a vehicle and positioning the lift(s) relative to the vehicle, the lifting system may start to lift the vehicle. In this embodiment the lifting operation stops as soon as the load no longer rests on the tires of the vehicle and is preferably carried by the shaft of the vehicle (and therefore the lift). An operator, user and/or driver may check whether the engagement of the lifting system on the vehicle is correct and may authorize the lifting system to proceed lifting and further lift the vehicle.

As a further advantage of providing one ore more load sensors the load to be lifted is known to the system and/or operator, user or driver. This may prevent overload of the system and/or enables further adjustments to system settings before the actual lifting starts or continues. Preferably, this engagement check is performed using a camera system that is provided on the lift, for example on the carrier thereof, as described above.

In a further preferred embodiment of the invention the lifting system further comprises a display for providing a user with a visual and/or other indication of the engagement and/or load on the lift and/or shaft. In a presently preferred embodiment a visual indication is provided on a touch screen that is accessible to the user or operator of the system.

The invention further relates to a method for lifting a vehicle, the method comprising the steps of:

- providing a lifting system comprising a stationary lift and a number of moveable lifts;
- providing a lifting system comprising a stationary lift and a number of moveable lifts;
- riding the vehicle towards the lifting system;
- defining a first position of a first wheel axle of the vehicle with positioning means;
- measuring a first distance between the vehicle and a reference point;
- moving the vehicle and defining a second position of a second wheel axle of the vehicle with the positioning means;
- measuring a second distance between the vehicle and the reference point;
- calculating from the first and second distances the wheel base distance between the first and second wheel axles with the control means.

The same effects and advantages apply for the method as described for the system. The method according to the invention involves a wheel based measuring system preferably performing a measurement for every wheel axle that needs to be lifted by the wheel based measuring lifting system according to the invention.

In a presently preferred embodiment the method according to the invention performs a measurement of a distance between a reference point and the vehicle, for example the front or the back thereof, as a reference distance for a wheel axle. From the measured distances of two reference distances the wheel base distance between two wheel axles can be calculated.

Preferably, the control means involve a process controller, preferably the lifting system controller, uses the calculated distances to position the movable lifts of the lifting system.

After positioning the one or more movable lifts relative to the vehicle with the control means, the vehicle can be lifted.

In one of the embodiments of the present invention the first wheel axle is the front wheel axle of the vehicle. By having the front wheel axle measured as first wheel axle the vehicle can be positioned in a forward driving direction relative to the lifting system.

In one of the embodiments according to the invention the first wheel axle is lifted by the stationary lift during a lifting operation.

In an alternative embodiment according to the present invention the first wheel axle is lifted by one of the movable lifts during a lifting operation. An advantage of having the first wheel axle lifted by one of the movable lifts, is that, in case the stationary lift is already provided with a wheel recess, this existing wheel recess can be easily adapted and used for the wheel based measuring system according to the invention. This is especially beneficial for existing conventional lifting systems.

In this alternative embodiment wheel base measuring is achieved by driving the vehicle in a forward direction with such that the wheel of the front axle or axle is positioned in the wheel recess associated with the stationary lift. Then the measuring system performs the required measurement(s). The remaining axles can be measured thereafter by repositioning the vehicle. After the measurements have been performed the vehicle is positioned in the lifting position with the wheels of the rear axle that needs to be lifted in the wheel recess and the movable lifts positioned correctly. In fact, the rear wheels maintain in the wheel recess of the stationary lift in this embodiment/configuration. Then the vehicle can be lifted.

BRIEF DESCRIPTION OF THE DRAWINGS

Further advantages, features and details and of the embodiment will be elucidated on the basis of preferred embodiments therefore wherein reference is made to the accompanying drawings, in which.

DESCRIPTION OF THE INVENTION

Figure 1:
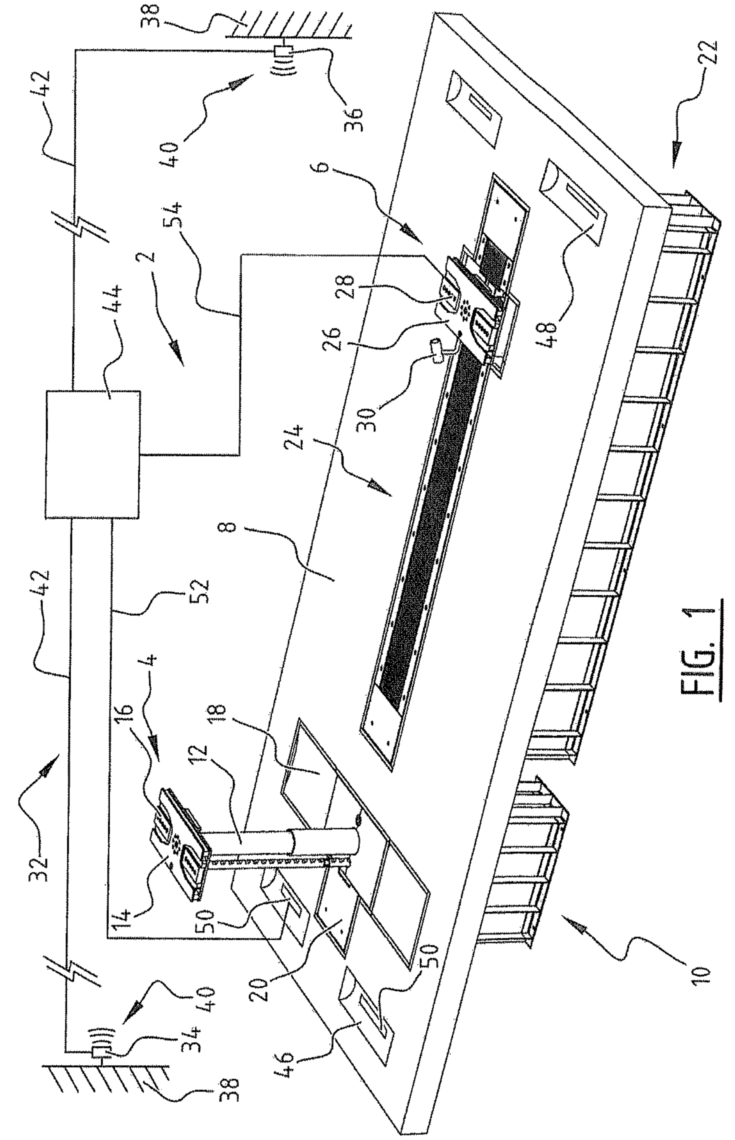
FIG. 1 shows a view of the system according to the present invention.

A lifting system 2 (FIG. 1) comprises a stationary lifting column 4 and a moveable lifting column 6 that are located on or in floor 8. The front lifting column 4 is provided in cassette or box 10 with a telescopic lifting cylinder 12. On top of cylinder 12 there is provided carrier 14 with axle carriers 16. In the illustrated embodiment wheel edges or wheel recesses 18 are provided. Recesses 18 define the position of the front wheels of the vehicle. Furthermore, in the illustrated embodiment a hatch 20 is provided in front of the front lifting column 4 for maintenance, for example.

The moveable lifting column 6 moves in cassette or box 22. Box 22 provides a pit with a slot or recess 24 for guiding the moveable lifting column 6. Moveable lifting column 6 is provided with carrier 26 whereon axle carriers 28 are mounted. Depending on the type of vehicle additional adapters can be provided that cooperate with carriers 14, 26 to enable engagement with different axle dimensions.

Lifting column 6 is optionally provided with camera 30 that enables a safety check when system 2 is about to lift the vehicle and allows the operator to additionally check the engagement of the carrier 26 on the axle of the vehicle.

Depending on the dimensions and configuration of the axle of the vehicle additional adapters (not shown) can be provided with the carriers 14, 26. Optionally, camera 30 is provided as a stand-alone system to assist the operator when using system 2. In addition or alternatively, camera 30 can be used as an axle or wheel recognition system capable of determining the type and/or dimensions of an axle or wheel to be lifted.

Using system 2 enables positioning the moveable lifting column 6 with accuracy of at least 2.5 cm and preferably within the range of about 1.25 cm.

Further details of conventional parts of system 2 are disclosed in WO 2006/112857 which is included by reference herein. WO 2006/112857 specifically discloses a scissor type lifting device that is positioned in a pit. This pit with a pit cover and lifting means involving auxiliary adapters engaging the axle of the vehicle have been described in detail herein.

Wheel base measuring system 32 comprises sensor 34, 36.

In the illustrated embodiment sensor 34, 36 is positioned on or against wall 38 to provide a stable reference point for the measurement. Sensor 34, 36 provides a signal 40 when performing a distance measurement. Signal 40 may use infrared, ultrasound and/or another signal. The use of such signal 40 prevents physical contact between the sensor 34, 36 and the wheels or axles of the vehicle. Measurement signal 42 is provided to controller 44. Controller 44 steers the required sensor activities and performs the desired calculations. Controller 44 starts a measurement when a wheel of the vehicle is in recess 46, 48. Recesses 46, 48 can be provided with a sensor 50, for example a load sensor. Sensor 50 provides a measurement signal 52 to controller 44 indicative of the presence of a wheel in recess 46, 48. Optionally recess 46 can be combined with wheel recesses 18 to provide one recess adjacent to stationary lift 4. It will be understood that one recess 46, 48 will suffice for the wheel base measuring system 32 included in lifting system 2. In one of the preferred embodiments recess 46 is combined with wheel recess 18 such that no additional recesses are required.

A measurement is performed between a reference point and a defined position of the vehicle, for example the front or back of the vehicle, or other vehicle reference point.

In the illustrated embodiment controller 44 provides a steering command 54 to the movable lift 6.

Figure 2:
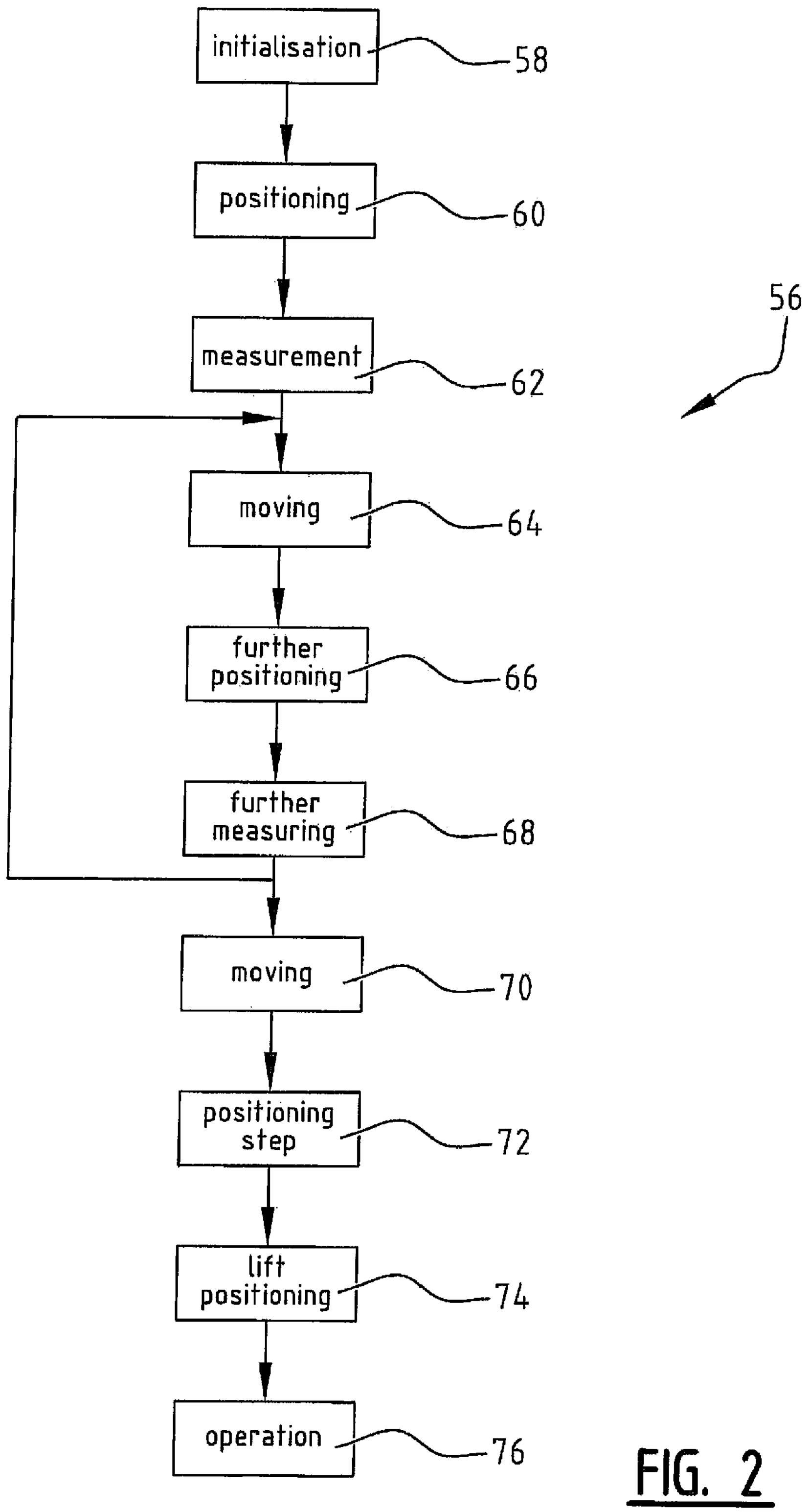
FIG. 2 shows a schematic diagram of the method and system of FIG. 1.

Lifting operation 56 (FIG. 2) first performs an initialization step 58. Then a first axle of a vehicle is positioned by providing a wheel in a recess in positioning step 60. Thereafter measurement step 62 is performed to measure the distance between the vehicle and a reference point. The vehicle is moved forward in step 64 and a second wheel is positioned in the recess in step 66 such that a further measuring step 68 can be performed. In case more than two axles need to be lifted the vehicle is moved further and steps 64, 66, 68 are performed again. Finally, the vehicle moves towards the lifting system in step 70. The wheels are positioned in positioning step 72 relative to the stationary lift 4. Thereafter, or alternatively at the same time, the one or more movable lifts 6 are positioned relative to the further axles in positioning step 74 such that the vehicle is positioned relative to the lifting system and is ready for lifting operation 76. At the end of the lifting operation the vehicle is removed from lifting system 2.

Figure 3:
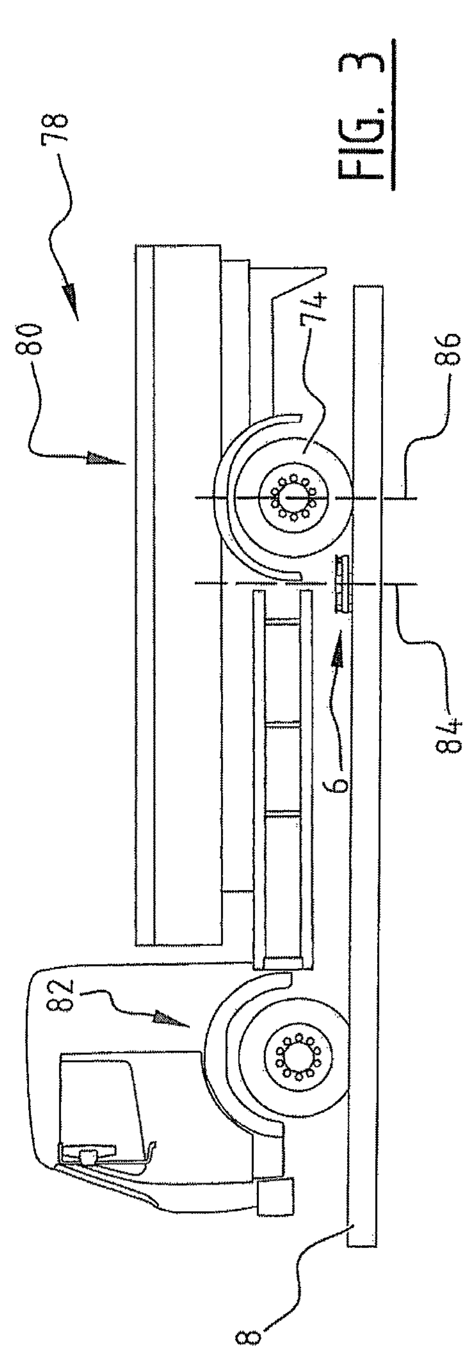
FIGS. 3-4 show a vehicle being lifted by the system of FIG. 1.
Figure 4:
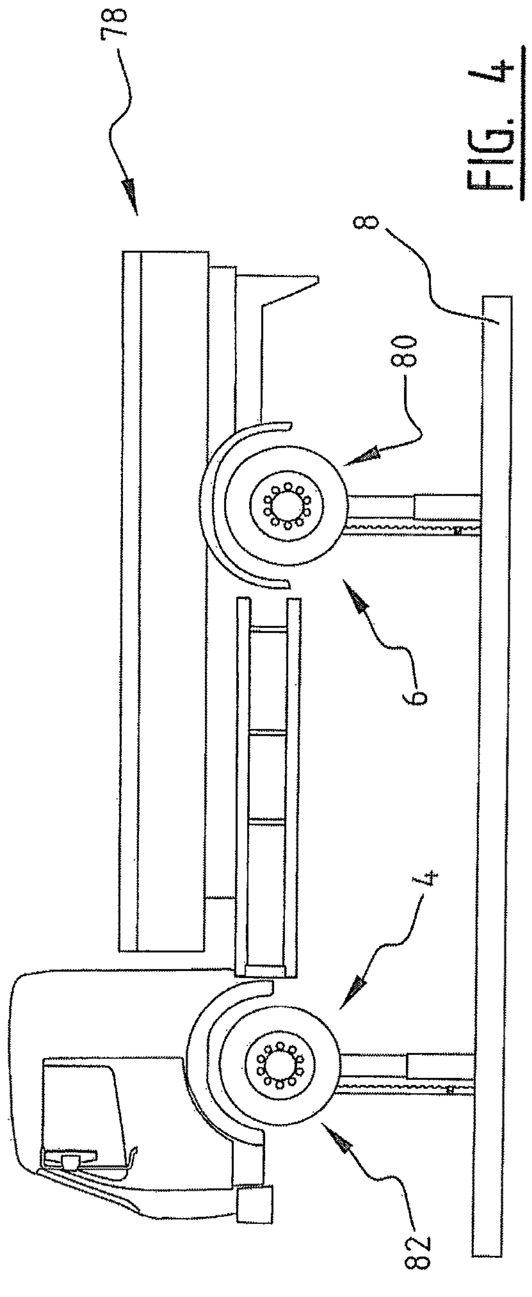

A vehicle 78 (FIGS. 3-4) is positioned over or relative to system 2. Moveable lifting device 6 is positioned under rear axle 80 of vehicle 78 using wheel base measuring system 32 that is integrally provided with lifting system 2 in the illustrated embodiment.

Rear axle 80 is lifted by movable lifting column 6, while front axle 82 is lifted by stationary lifting column 4. In the illustrated embodiment movable lift 6 moves from starting positioned 84 to the desired lifting position 86.

In the illustrated embodiment lifts 4, 6 engage axles 80, 82 directly, such that lifting position 86 corresponds to the rear axle 80 location. As described earlier, carriers 14, 26 may engage other parts of the vehicle. Furthermore, in the illustrated embodiments one moveable lifting column 6 is shown. Alternatively, more than one, for example two, moveable lifting columns 6 can be provided for system 2. When engaging the axles of the vehicle for lifting, the number of lifting devices 4, 6 may depend on the size of the vehicle and/or number of axles of the vehicle. It will be understood that either the front wheel axle or a rear wheel axle can be lifted by the stationary lift during a lifting operation.

Figure 5:
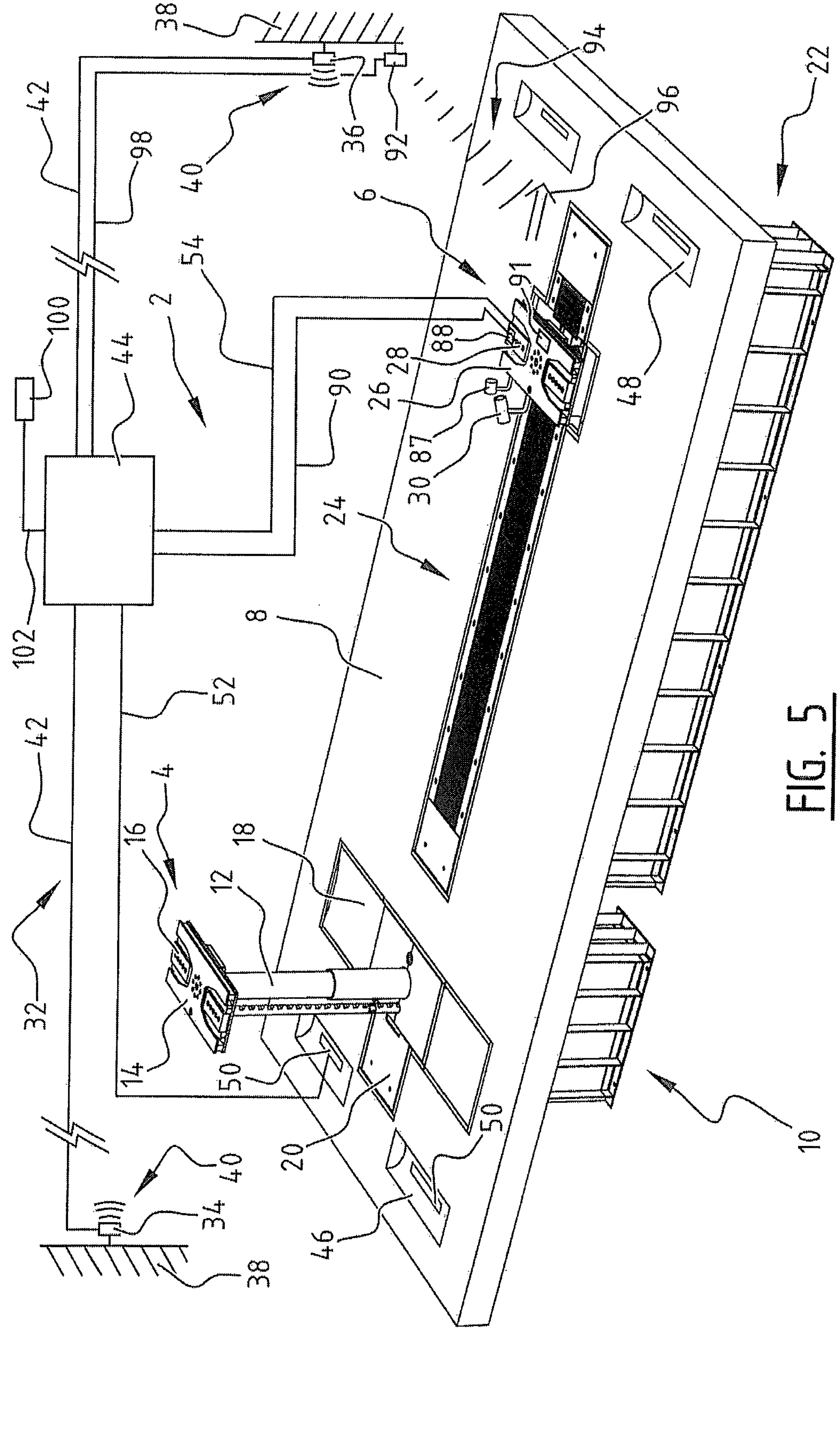
FIG. 5 shows further options available to the system according to the present invention.

Further options are available for lifting system 2 (FIG. 5). This relates to providing light source 87 to improve the quality of the camera view. Also, this may relate to load sensor 88 on carrier 26 that enables measurement of the load on carrier 26. The measurement is provided to controller 44 with signal 90. Optionally, battery 91 is provided attached to lift 6 to prevent the use of cables, thereby increasing safety of system 2. Furthermore, projector 92 can be provided to send an indication signal 94 providing a visual indication 96, such as an arrow or other indication, for a driver of the vehicle 78. This may assist a driver of vehicle 78 when manoeuvring vehicle 78 relative to system 2. Projector 92 receives command signal 98 from controller 44. In the illustrated embodiment controller 44 communicates with touch screen 100 via bi-directional communication connection 102. This may involve receiving user input and displaying relevant information to a user, operator and/or driver of vehicle 78.

The present invention is by no means limited to the above described preferred embodiments thereof. The rights sought are defined by the following claims, within the scope of which many modifications can be envisaged. For example, it is explicitly mentioned that the combinations of the illustrated embodiments are possible. In the illustrated embodiments axle carriers have been shown. Alternatively, other carriers engaging other parts of the vehicle to be lifted can be applied.

The invention claimed is:

1. A wheel base measuring lifting system for lifting a vehicle, comprising:

(a) one stationary lift;

(b) a number of moveable lifts;

(c) positioning means for defining a position of a wheel axle of the vehicle;

(d) distance measuring means for measuring a first distance of the vehicle to a reference point while the vehicle is in a first position and a second distance of the vehicle to the reference point after the vehicle has moved from the first position to a second position; and (e) control means for determining the distance between two vehicle axles from the first distance and the second distance measured by the distance measuring means and providing a steering command to the one or more moveable lifts to position the one or more movable lifts in the correct position, wherein the control means is configured to calculate a wheel base distance of the vehicle, thereby automatically detecting the correct position of the one or more movable lifts, and wherein the distance measurement means comprises one or more stationary sensors to measure the first distance of the vehicle and the second distance of the vehicle.

2. The wheel base measuring lifting system according to claim 1, wherein the positioning means comprise a recess.

3. The wheel base measuring lifting system according to claim 2, wherein the recess is provided with a detector.

4. The wheel base measuring lifting system according to claim 2, wherein the recess corresponds to a wheel recess associated with the stationary lift.

5. The wheel base measuring lifting system according to claim 1, wherein the distance measuring means comprise a transmitter and a receiver.

6. The wheel base measuring lifting system according to claim 1, wherein the control means comprise a process controller.

7. The wheel base measuring lifting system according to claim 6, further comprising a camera system mounted on at least one of the one or more movable lifts configured for detecting the engagement of the at least one of the one or more movable lifts on the vehicle.

8. The wheel base measuring lifting system according to claim 6, wherein at least one of the one or more movable lifts comprises a load sensor to measure the load on the at least one of the one or more movable lifts.

9. The wheel base measuring lifting system according to claim 8, wherein the load sensor is configured to provide an indication that the load is put on the wheel axle of the vehicle.

10. The wheel base measuring lifting system according to claim 6, further comprising a display for providing a user with a visual indication of the engagement and/or load on at least one of the one or more movable lifts and/or the wheel axle.

11. The wheel base measuring lifting system according to claim 1, wherein the one or more stationary sensors of the distance measurement means are positioned on or against a wall.

12. A method for lifting a vehicle, comprising the steps of:

(a) providing a lifting system comprising a stationary lift and a number of moveable lifts;

(b) riding the vehicle towards the lifting system;

(c) defining a first position of a first wheel axle of the vehicle with a positioning means;

(d) measuring a first distance between the vehicle and a reference point using one or more stationary sensors;

(e) moving the vehicle and defining a second position of a second wheel axle of the vehicle with the positioning means;

(f) measuring a second distance between the vehicle and the reference point using the one or more stationary sensors; and (g) calculating from the first and second distances the wheel base distance between the first and second wheel axles with a control means, and automatically detecting a desired lifting position of one or more of the movable lifts.

13. The method according to claim 12, further comprising the steps of:

(h) positioning the vehicle relative to the stationary lift;

(i) positioning the one or more moveable lifts relative to the vehicle with the control means; and (j) lifting the vehicle.

14. The method according to claim 12, wherein the first wheel axle is the front wheel axle of the vehicle.

15. The method according to claim 12, wherein the first wheel axle is lifted by the stationary lift during a lifting operation.

16. The method according to claim 12, wherein the first wheel axle is lifted by one of the moveable lifts during a lifting operation.

17. The method according to claim 12, wherein the one or more stationary sensors are positioned on or against a wall.

* * * * *